US009615201B2

(12) United States Patent
Alkabra et al.

(10) Patent No.: US 9,615,201 B2
(45) Date of Patent: Apr. 4, 2017

(54) CLOSED COMMUNICATION SYSTEM

(71) Applicant: T-Mobile USA, Inc., Bellevue, WA (US)

(72) Inventors: Ahmad O. Alkabra, Newcastle, WA (US); Cristian Asandului, Snoqualmie, WA (US); Jean-Luc Rene Bouthemy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 42 days.

(21) Appl. No.: 14/196,994

(22) Filed: Mar. 4, 2014

(65) Prior Publication Data

US 2014/0248887 A1 Sep. 4, 2014

Related U.S. Application Data

(60) Provisional application No. 61/772,442, filed on Mar. 4, 2013.

(51) Int. Cl.
*H04W 4/02* (2009.01)
*H04M 1/725* (2006.01)
*H04W 64/00* (2009.01)

(52) U.S. Cl.
CPC ........ *H04W 4/021* (2013.01); *H04M 1/72572* (2013.01); *H04M 1/72577* (2013.01); *H04W 64/00* (2013.01)

(58) Field of Classification Search
CPC ....... H04W 4/16; H04W 12/06; H04W 24/02; H04W 4/021; H04W 56/00; H04W 56/001; H04W 64/00; H04W 72/10; H04W 84/045; H04M 1/72577; H04M 15/8066; H04M 1/27; H04M 1/27455; H04M 1/72572
See application file for complete search history.

(56) References Cited

U.S. PATENT DOCUMENTS

| | | | |
|---|---|---|---|
| 8,509,740 B2 * | 8/2013 | Salkini | H04W 48/04 455/411 |
| 2005/0113070 A1 * | 5/2005 | Okabe | H04W 12/08 455/411 |
| 2007/0035513 A1 * | 2/2007 | Sherrard | G06F 3/04817 345/157 |

(Continued)

*Primary Examiner* — Matthew Sams
(74) *Attorney, Agent, or Firm* — Lee & Hayes, PLLC

(57) ABSTRACT

A system is described herein that includes mobile communication devices and a cellular base station to communicate with a telecommunication network. The mobile communication devices access telephony service through the cellular base station when inside a geofence. The mobile communication devices determine whether they are inside the geofence based on distances from proximity beacons. When outside of the geofence, the mobile communication devices are prevented from accessing telephony service through the cellular base station. When inside the geofence, the mobile communication devices may access telephony service through the cellular base station. The mobile communication devices may only make and receive calls from mobile communication devices of a specific other system. When a call is received at the system, the mobile communication devices of the system are rung. To enable this, a serving call session control function of the telecommunication network forks a call directed to the system.

12 Claims, 7 Drawing Sheets

(56) References Cited

U.S. PATENT DOCUMENTS

| | | | |
|---|---|---|---|
| 2010/0041333 A1* | 2/2010 | Ungari et al. ................ | 455/41.2 |
| 2010/0157891 A1* | 6/2010 | Mikan .................... | H04M 3/465 |
| | | | 370/328 |
| 2011/0273576 A1* | 11/2011 | Zambetti et al. .......... | 348/222.1 |
| 2013/0023254 A1* | 1/2013 | Ricci ................... | H04M 3/4234 |
| | | | 455/417 |
| 2013/0029660 A1* | 1/2013 | Deshpande ........... | H04W 4/021 |
| | | | 455/426.1 |
| 2013/0242775 A1* | 9/2013 | Taylor ........................... | 370/252 |
| 2013/0303166 A1* | 11/2013 | Jain ..................... | H04W 76/048 |
| | | | 455/435.2 |
| 2014/0045472 A1* | 2/2014 | Sharma .................. | H04W 4/08 |
| | | | 455/416 |
| 2014/0128095 A1* | 5/2014 | Finlow-Bates ....... | H04W 4/021 |
| | | | 455/456.1 |

* cited by examiner

CLOSED COMMUNICATION SYSTEM

RELATED APPLICATIONS

This patent application claims priority filing benefit from U.S. Provisional Patent Application No. 61/772,442, filed Mar. 4, 2013, which is hereby incorporated by reference, in its entirety.

BACKGROUND

With the increasing distribution and ease of access of wireless access points, including cellular base stations such as picocell or femtocell base stations, privacy of certain communications is a growing concern. For example, within a baseball park (also referred to herein as a "ballpark"), it is critical that communications between the bullpen and dugout of each team be private. Other teams and third parties must be prevented from intercepting or overhearing those communications. Also, if other devices are able to share the wireless spectrum with the dugout or bullpen, the ability of dugout or bullpen devices to communicate may be impaired by congestion. This impaired ability to communicate may be every bit as damaging as compromised privacy in a live game.

While many of these problems were not present in previous, wireline solutions, wireline phones come with their own disadvantages, such as delay in answering the phone while one walks to pick it up, or impaired mobility because one is trying to stay close to the phone.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for providing closed communication between devices at two paired specific pre-defined location areas, such as a dugout and bullpen of a ballpark. To provide the closed communication, each specific pre-defined location area may be equipped with a communication tower and wireless communication antennas. Each communication tower may include a cellular base station, such as a picocell or femtocell base station, as well as a plurality of charging components for corresponding mobile communication devices. The mobile communication devices associated with a specific communication tower may share a public identifier, such as a telephone number, such that a call made to that specific pre-defined location area results in all of the mobile communication devices of that location area's communication tower being rung.

In various embodiments, to simultaneously ring the multiple mobile communication devices at a specific pre-defined location area, the telecommunication network connecting the mobile communication devices of the two specific pre-defined location areas may fork a call made from a mobile communication device at one specific pre-defined location area to generate call legs to each of the mobile communication devices at the other specific pre-defined location area. More specifically, a S-CSCF of an IMS of the telecommunication network may receive the call, determine the public identifier being called and all private identifiers associated with the public identifier, and fork the call by generating a call leg for each of the private identifiers. The private and public identifiers may have previously been received by the S-CSCF during IMS registration, and the private and public identifiers may be stored in a home subscriber server (HSS) of the IMS.

In further embodiments, to ensure that the communication is closed and private, the mobile communication devices associated with a communication tower at a specific pre-defined location area are only enabled to access telephony service through to the cellular base station of the communication tower when they are within a geofence associated with the specific pre-defined location area. Each mobile communication device is configured to determine whether it is within the geofence based at least in part on distances of the mobile communication device from one or more proximity beacons. The proximity beacons may be placed within or nearby to the specific pre-defined location area. Because the antennas may allow for such connectivity to devices outside of the specific pre-defined location area, the use of the proximity beacons and the resulting geofence ensures that the mobile communication devices are both able to wirelessly connect and within the desired specific pre-defined location area when they do so. In some embodiments, the mobile communication devices lock and inform their users that they are locked when outside of the geofence.

Example Closed Communication System

Figure 1B:
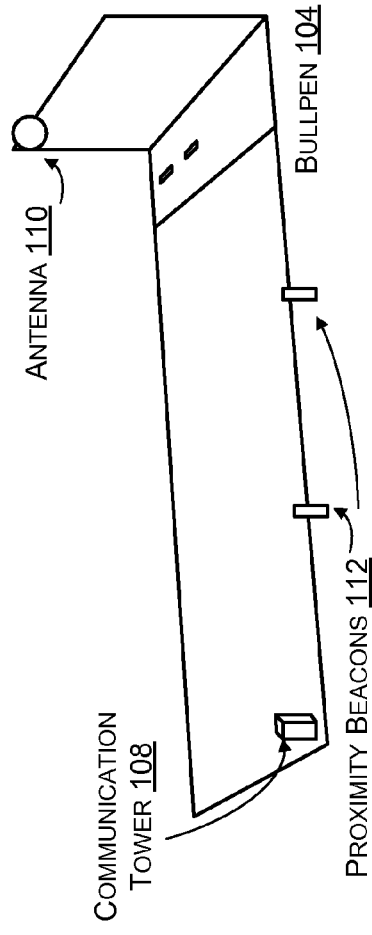
FIGS. 1a-1c illustrate a baseball park as an example closed communication system, as well as dugouts and bullpens equipped with communication towers and antennas. The communication towers are equipped with mobile communication devices, and mobile communication devices from one dugout may make or receive calls from one of the bullpens, but not the other.
Figure 1C:
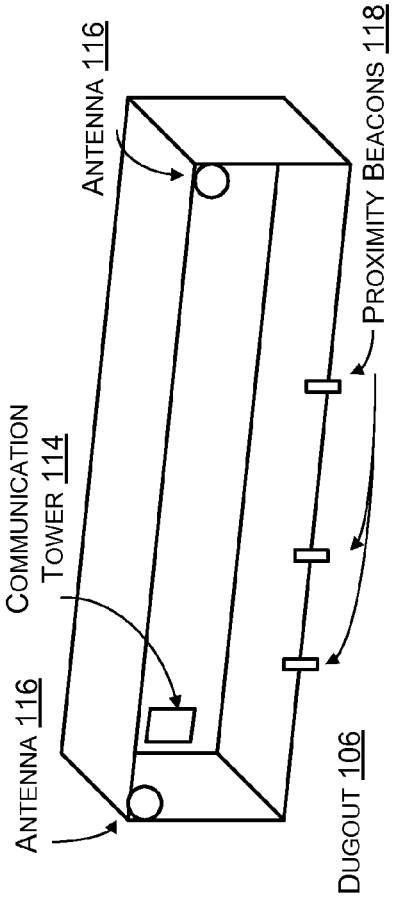
Figure 1A:
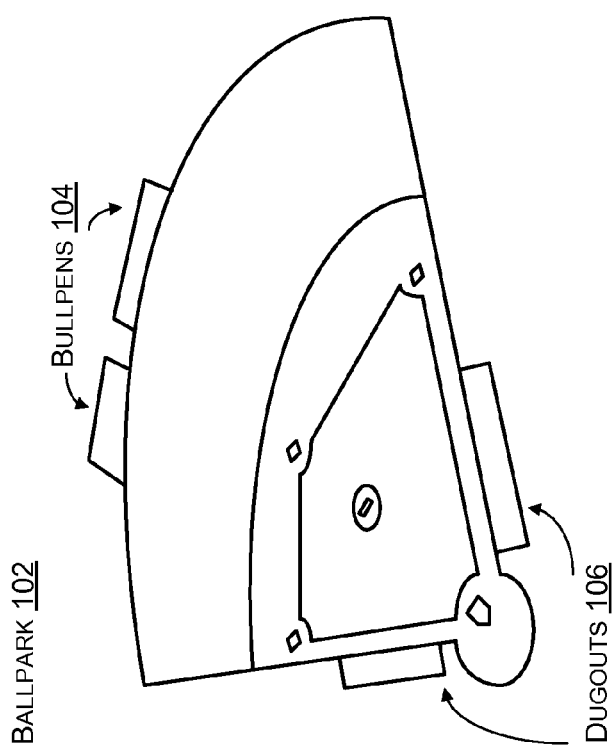

FIGS. 1a-1c illustrate a baseball park as an example closed communication system, as well as dugouts and bullpens equipped with communication towers and antennas.

The communication towers are equipped with mobile communication devices, and mobile communication devices from one dugout may make or receive calls from one of the bullpens, but not the other. As illustrated in FIG. 1a, a ballpark 102 may include home and visiting team bullpens 104 and home and visiting team dugouts 106. To ensure that neither team is able to intercept the other's communications, and to prevent interception by fans at the ballpark 102 or by other third parties, the ballpark 102 provides two closed communication systems, one from the home team bullpen 104 to the home team dugout 106, the other from the visiting team bullpen 104 to the visiting team dugout 106.

FIG. 1b shows an example bullpen 104 in greater detail. As illustrated, the bullpen 104 is equipped with a communication tower 108, which includes a cellular base station and mobile communication devices, as well as one or more antennas 110 and one or more proximity beacons 112. The communication tower 108, antenna(s) 110, and proximity beacon(s) 112 may be placed by service personnel in such a way as to maximize wireless coverage within the bullpen 104 but to prevent coverage outside of the bullpen 104. The radio frequency (RF) coverage of the antenna(s) 110 may extend beyond the bullpen 104 in one or more directions. Thus, proximity beacon(s) 112 are used in conjunction with distance thresholds implemented by mobile communication device software to limit the coverage to substantially include locations in the bullpen 104 and exclude locations outside of the bullpen 104.

Figure 2:
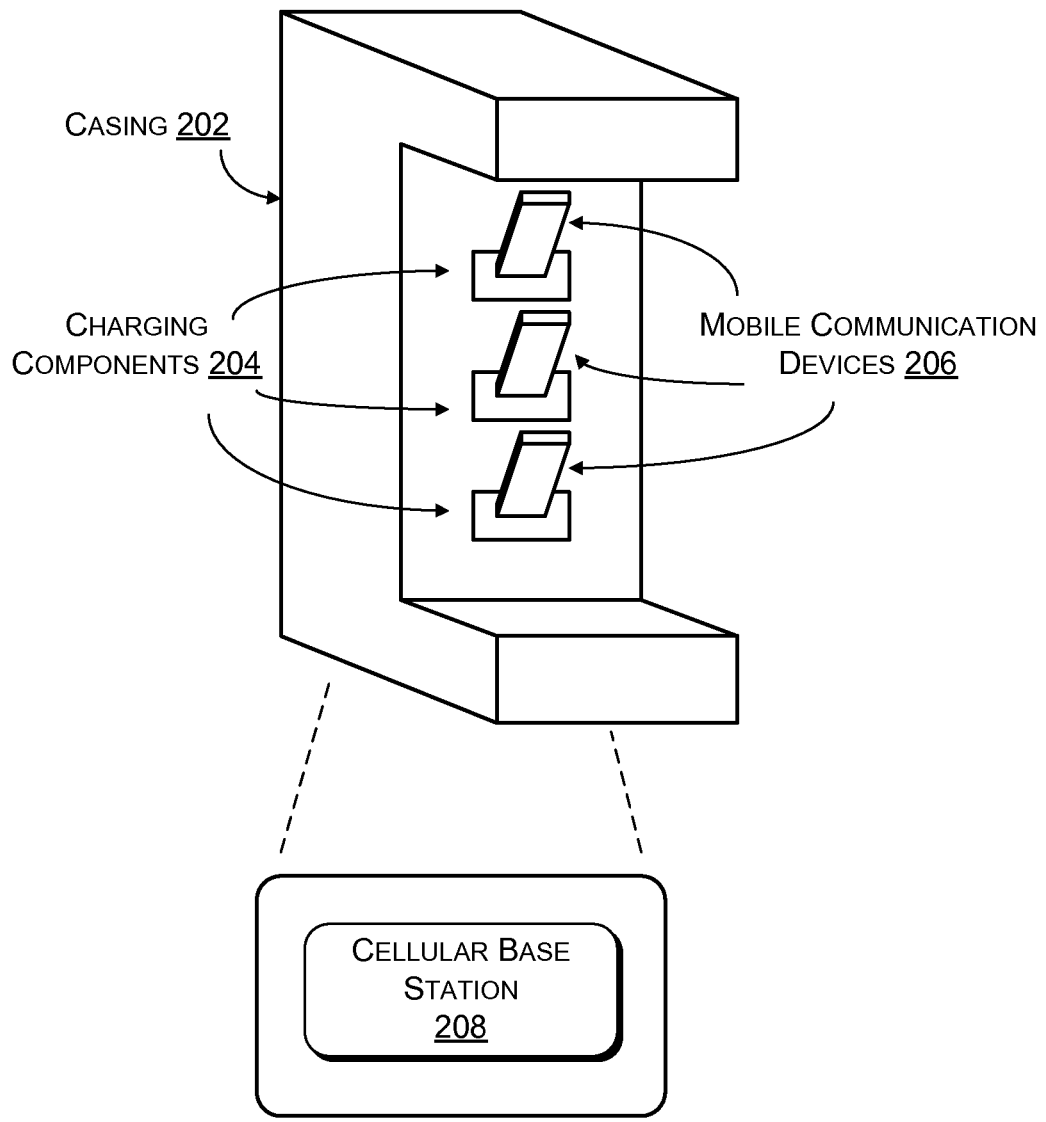
FIG. 2 illustrates an example communication tower equipped with a cellular base station, charging components, and mobile communication devices which are only enabled to communicate when within a geofence associated with specific pre-defined location area.

An example of the communication tower 108 is illustrated in FIG. 2 and is described below with reference to that figure. The antenna(s) 110 may be any sort of RF antennas configured to receive and transmit wireless RF communications to the cellular base station included in the communication tower 108. The proximity beacon(s) 112 may be any sort of beacons, such as Bluetooth® beacons.

The threshold distances and proximity beacon(s) 112 may define a geofence for the bullpen 104. Each mobile communication device of the communication tower 108 may measure signal strengths of each proximity beacon 112 and may, in conjunction with known positions of the proximity beacon(s) 112, measure distances of that mobile communication device from the proximity beacon(s) 112. If the mobile communication device is within a threshold distance of one of the proximity beacon(s) 112, or if the average distance from the proximity beacon(s) 112 is less than a threshold, the mobile communication device determines that it is within the geofence.

While within the geofence, the mobile communication device may make calls to mobile communication devices of the counterpart dugout 106 and receive calls from the mobile communication devices of the counterpart dugout 106. When receiving calls, all mobile communication devices of the communication tower 108 are rung.

When outside of the geofence, the mobile communication device does not provide any services to the user and informs the user that it is locked. If the user remains outside of the geofence from a threshold amount of time, the mobile communication device may initiate a wipeout (also referred to as "bricking" the device).

FIG. 1c shows an example dugout 106 in greater detail. As illustrated, the dugout 106 is equipped with a communication tower 114, which includes a cellular base station and mobile communication devices, as well as one or more antennas 116 and one or more proximity beacons 118. The communication tower 114, antenna(s) 116, and proximity beacon(s) 118 may be placed by service personnel in such a way as to maximize wireless coverage within the dugout 106 but to prevent coverage outside of the dugout 106. The RF coverage of the antenna(s) 116 may extend beyond the dugout 106 in one or more directions. Thus, proximity beacon(s) 118 are used in conjunction with distance thresholds implemented by mobile communication device software to limit the coverage to substantially include locations in the dugout 106 and exclude locations outside of the dugout 106.

An example of the communication tower 114 is illustrated in FIG. 2 and is described below with reference to that figure. The antenna(s) 116 may be any sort of RF antennas configured to receive and transmit wireless RF communications to the cellular base station included in the communication tower 114. The proximity beacon(s) 118 may be any sort of beacons, such as Bluetooth® beacons.

The threshold distances and proximity beacon(s) 118 may define a geofence for the dugout 106. Each mobile communication device of the communication tower 114 may measure signal strengths of each proximity beacon 118 and may, in conjunction with known positions of the proximity beacon(s) 118, measure distances of that mobile communication device from the proximity beacon(s) 118. If the mobile communication device is within a threshold distance of one of the proximity beacon(s) 118, or if the average distance from the proximity beacon(s) 118 is less than a threshold, the mobile communication device determines that it is within the geofence.

While within the geofence, the mobile communication device may make calls to mobile communication devices of the counterpart bullpen 104 and receive calls from the mobile communication devices of the counterpart bullpen 104. When receiving calls, all mobile communication devices of the communication tower 114 are rung.

When outside of the geofence, the mobile communication device does not provide any services to the user and informs the user that it is locked. If the user remains outside of the geofence from a threshold amount of time, the mobile communication device may initiate a wipeout/brick the device.

Example Communication Tower

FIG. 2 illustrates an example communication tower equipped with a cellular base station, charging components, and mobile communication devices which are only enabled to communicate when within a geofence associated with the specific pre-defined location area. The communication tower 200 may be an example of a communication tower 108 of a bullpen 104 or a communication tower 114 of a dugout 106. A ballpark 102 may have four communication towers 200 used to establish two closed communication systems.

As illustrated, the communication tower includes a casing 202 that is coupled to charging components 204 for charging mobile communication devices 206. The communication tower 200 also includes a cellular base station 208 which may be internal to and coupled to the casing 202.

In some embodiments, the casing 202 may be a hard shell affixed to the ground or a wall of a bullpen 104 or dugout 106. In addition to the charging components 204, which may be configured to receive and hold in place the mobile communication devices 206 while powering them, the casing 202 may include a speaker and lights. The speaker may amplify the volume when the mobile communication devices 206 are being rung, and, in order to attract attention, the lights may also flash when the mobile communication devices 206 are being rung. The casing 202 may include coupling between the charging components 204 and one or more power sources, such as outlets, backup batteries, or both, as well as coupling between the one or more power sources and other components of the communication tower 200, such as the speaker, lights, and cellular base station 208.

Figure 3:
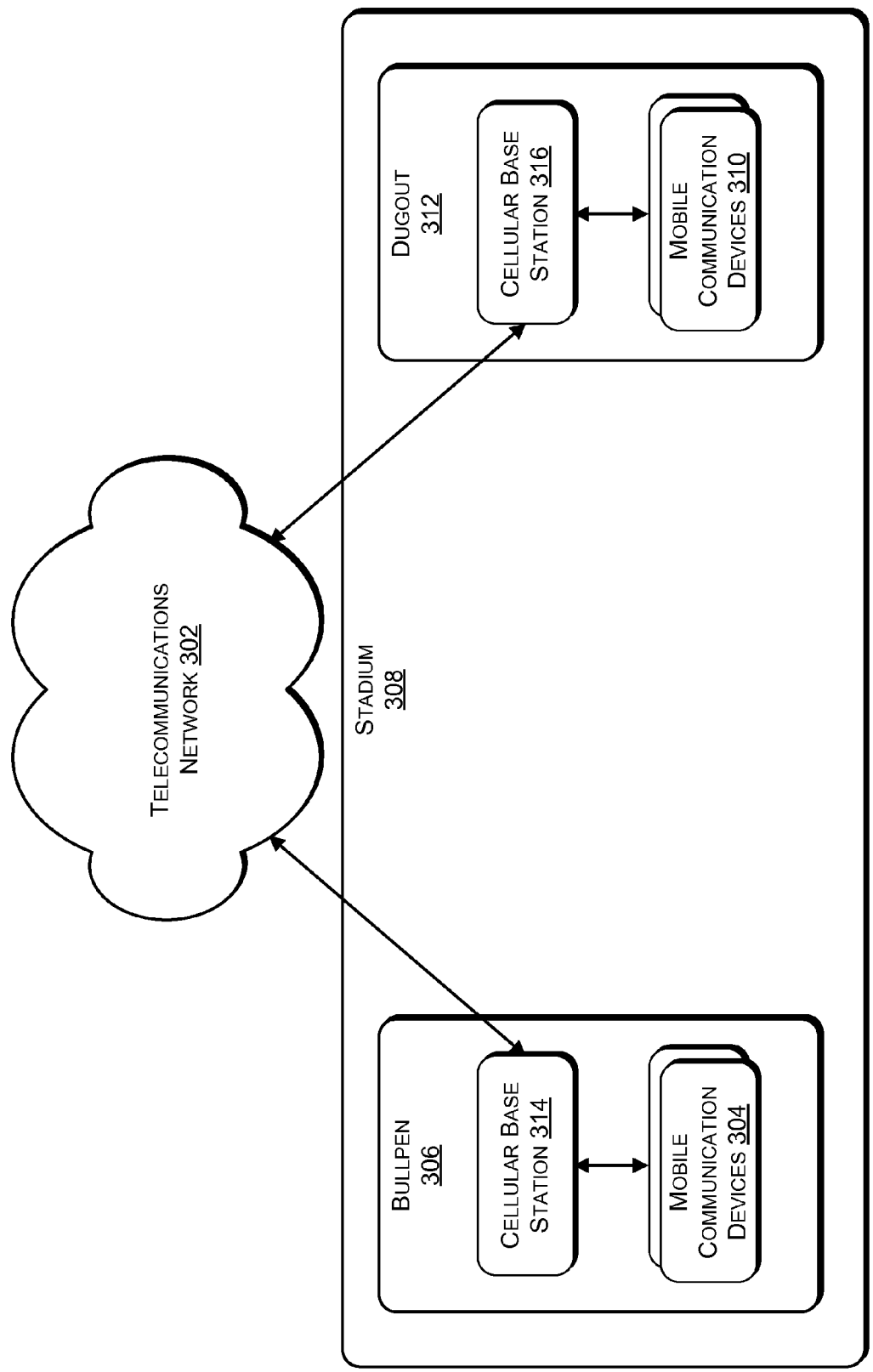
FIG. 3 illustrates an example telecommunication network connecting communication towers of a paired bullpen and dugout.
Figure 4:
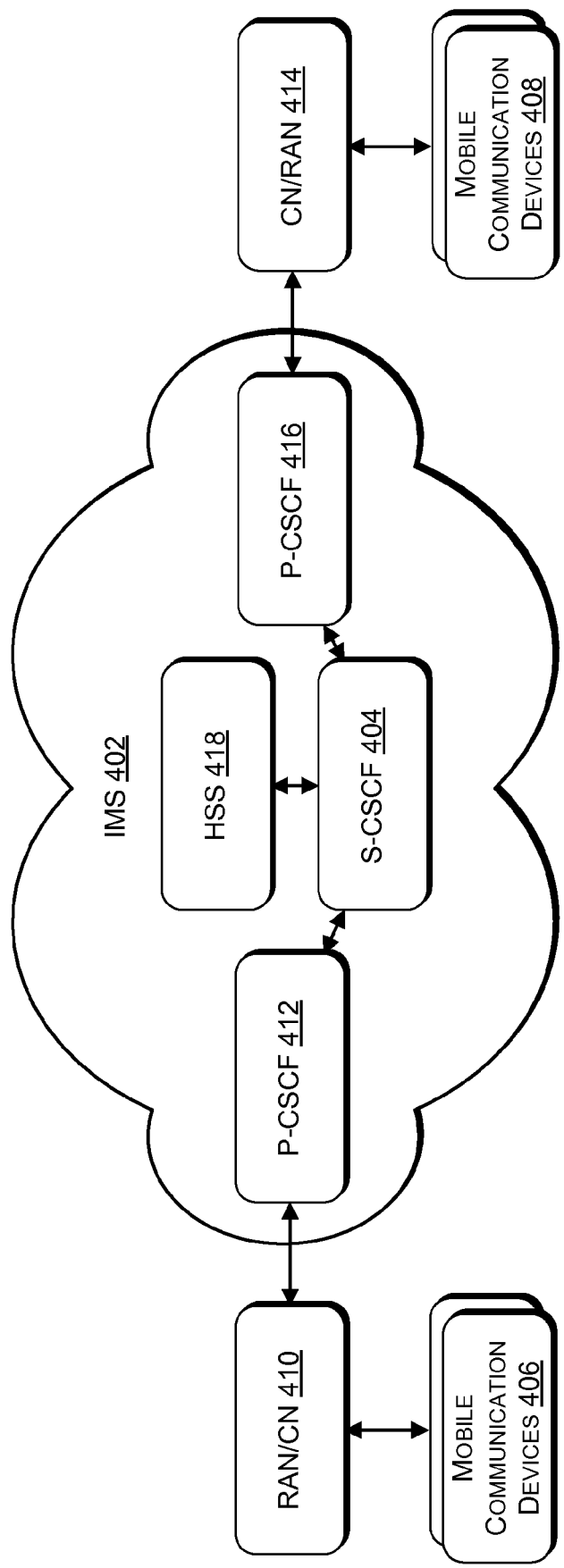
FIG. 4 illustrates an example Internet Protocol (IP) Multimedia Subsystem (IMS) for receiving and forking, at a serving call session control function (S-CSCF) of the IMS, calls from a mobile communication device to multiple other mobile communication devices.
Figure 7:
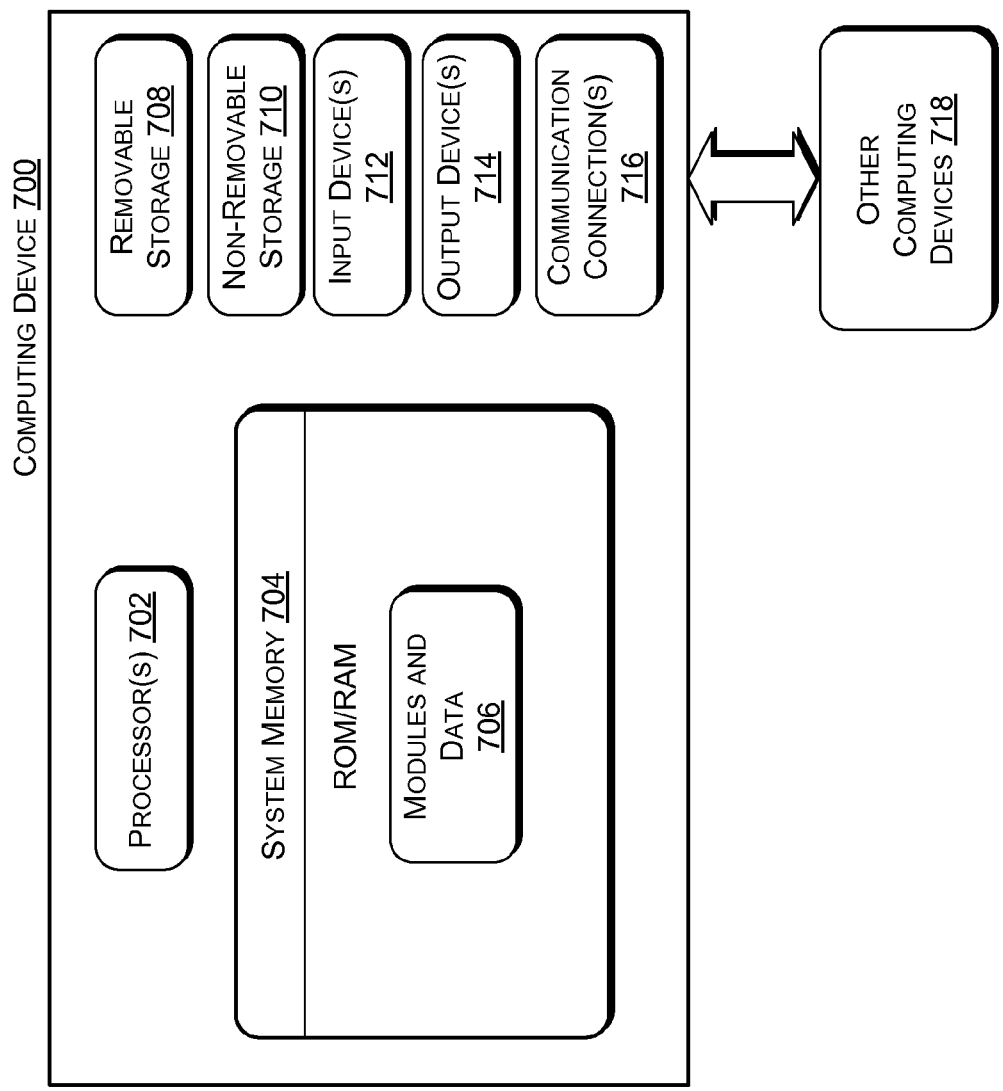
FIG. 7 illustrates an example system architecture of a computing device, such as a mobile communication device or a node serving as a S-CSCF.

In various embodiments, the mobile communication devices 206 may each be any sort of telecommunications device, such as a smart phone, a cellular phone, a personal digital assistant (PDA), a tablet computer, a personal computer (PC), a laptop, a desktop, a workstation, a media player, a gaming device, a television, a media center, or the like. The mobile communication devices 206 may also be IMS capable and may be associated with an IMS registration. As described below, they may also be associated with information provisioned to enable IMS services. Mobile communication devices 206 of a communication tower 200 may share a public identifier, such as an IP Multimedia Public Identifier (IMPU), and each of those mobile communication devices 206 may have its own private identifier, such as an IP Multimedia Private Identifier (IMPI). Examples of mobile communication devices 206 are illustrated in FIGS. 3, 4, and 7 and are described below in detail.

In some embodiments, as described above, the mobile communication devices 206 may be configured to determine their distances from proximity beacons and to determine, based on those distances, whether they are within a geofence associated with the specific pre-defined location area. The mobile communication devices 206 may also be configured to determine whether the cell global identity (CGI) of the cellular base station 208 matches a predefined list of CGIs, which may include only the CGIs of the two cells of the closed communication system with which the communication tower 200 is associated. If the mobile communication devices 206 are within the geofence and connected to a cellular base station 208 with a CGI included in the predefined list, then the mobile communication devices 206 are able to make and receive calls. As mentioned above, when receiving calls, all mobile communication devices 206 are rung substantially simultaneously. When a mobile communication device 206 is not connected to a cellular base station that has its CGI in the predefined list, or when the mobile communication device 206 is outside of the geofence, that mobile communication device 206 is locked and informs the user that it is locked. After being locked for a threshold time period, the mobile communication device 206 initiates a wipeout.

In further embodiments, the mobile communication devices 206 each provide a user interface enabling a user to initiate call with a single touch or action, such as a swipe, and to end the call in a same or similar manner. Because the mobile communication devices 206 can only call a single other party or specific pre-defined location area, there is no need to select a party being called.

The mobile communication devices 206 may also provide a plurality of other services, such as statistics, instant replays, messaging capabilities, or video calling capabilities.

The cellular base station 208 be or include any sort of computing device, such as a personal computer (PC), a laptop computer, a workstation, a server system, a mainframe, a server farm, or any other computing device. Also, modules and data of the cellular base station 208 may be implemented in a single computing device or disturbed among multiple computing devices. The cellular base station 208 may be any sort of base station, such as a base station, a Node B, or an eNode B. The cellular base station 208 may also be associated with any range of coverage and may be, for example, picocell or femtocell base station. Further, the cellular base station 208 may offer circuit-switched connections or packet-switched connections, such as High Speed Packet Access (HSPA), Evolved HSPA (HSPA+), or Long Term Evolution (LTE) connections. Examples of the cellular base station 208 are illustrated in greater detail in FIGS. 3 and 7 and are described in detail below with reference to those figures. Also, as mentioned, the cellular base station 208 is part of a telecommunications network. An example of such a telecommunications network is illustrated in greater detail in FIG. 3 is and described in detail below with reference to that figure.

When a mobile communication device 206 is within a geofence associated with the specific pre-defined location area, the mobile communication device 206 may access telephony service through the cellular base station 208. The cellular base station 208 may in turn maintain a connection with a radio network controller (RNC) or with a mobility management entity or a gateway device of the core network of the telecommunication network. Through these connections, the cellular base station 208 may provide voice, messaging, data, or other services to the mobile communication devices 206. In some embodiments, the cellular base station 208 is configured to only recognize and allow access to telephony service from the mobile communication devices 206 and to prevent access to telephony service from any other mobile communication devices.

Example Telecommunication Network

FIG. 3 illustrates an example telecommunication network connecting communication towers of a paired bullpen and dugout. As illustrated, a telecommunication network 302 enables mobile communication devices 304 of a first specific pre-defined location area, such as a bullpen 306 of a stadium 308, to communicate with other mobile communication devices 310 of another specific pre-defined location area, such as a dugout 312 of the stadium 308. The mobile communication devices 304 access telephony service through the telecommunication network via the cellular base station 314 of the bullpen 306. The mobile communication devices 310 access telephony service through the telecommunication network via the cellular base station 316 of the dugout 312.

The telecommunications network 302 may be include one or more telecommunications networks of telecommunications service provider(s). The telecommunications network 302 may include a core network and one or more access networks. The access networks may be circuit-switched, 3G access networks, HSPA or HSPA+ access networks, or LTE access network. Such access networks may include cellular base stations, such as cellular base station 208, cellular base station 314, and/or cellular base station 316. Examples of cellular base stations include base stations, node Bs, and eNode Bs. The access networks may also include radio network controllers (RNCs), etc. and may enable circuit-switched connections, packet-switched connections, or both. The access networks may also or instead include access points, such as WiFi access points, which connect to the core network(s) of the telecommunications network 302 through public or private packet networks. Examples of access networks are illustrated in FIG. 4 as radio access network (RAN) 410 and RAN 414 and are described below in greater detail.

The core network(s) of the telecommunications network 302 may include any of a gateway general packet radio service (GPRS) core network, a system architecture evolution (SAE) core network, or another sort of core network. The core network(s) of the telecommunications network 302 may also include an IMS, which is illustrated in FIG. 4 and described below in detail with reference to that figure.

Example of the mobile communication devices 304, bullpen 306, stadium 308, mobile communication devices 310, dugout 312, cellular base station 314, and cellular base station 316 are illustrated in FIGS. 1 and 2 and are described above with reference to those figures. As described above, the mobile communication devices 304 and mobile communication devices 310 may be the endpoints of a closed communication system which utilizes the telecommunication network 302 to bridge the paired specific pre-defined location areas of bullpen 306 and dugout 312. They may communicate over the telecommunication network 302 using, for instance, Voice over IP (VoIP) using HSPA, VoIP using HSPA+, or VoIP using LTE. The mobile communication devices 304 and mobile communication devices 310 access telephony service through their respective ones of cellular base station 314 and cellular base station 316, which may be edge devices of access networks of the telecommunication network 302.

Example IMS of Telecommunication Network

FIG. 4 illustrates an example IMS for receiving and forking, at a S-CSCF of the IMS, calls from a mobile communication device to multiple other mobile communication devices. As illustrated, an IMS 402 may include a S-CSCF 404 which receives registrations from mobile communication devices 406 and mobile communication devices 408. The mobile communication devices 406 may communicate with the S-CSCF 404 through a radio access network (RAN)/core network (CN) 410 and a proxy call session control function (P-CSCF) 412 of the IMS 402. The mobile communication devices 408 may communicate with the S-CSCF 404 through a CN/RAN 414 and a P-CSCF 416 of the IMS 402. The S-CSCF 404 may store or authenticate information receive with the registration using an HSS 418 of the IMS 402. FIG. 4 does not show nodes such as Policy Control Resource Function (PCRF) or Interrogating CSCF (I-CSCF) as these are used according to specifications defined by 3GPP (3rd Generation Partnership Project).

Examples of the mobile communication devices 406, mobile communication devices 408, RAN/CN 410, and CN/RAN 414 are described above in detail with respect to FIGS. 1-3.

In various embodiments, the IMS 402 may be an IMS layer of the telecommunication network for providing IP multimedia services for the telecommunication network. The IMS 402 includes HSS 418 and a number of nodes which form the call session control function (CSCF), including the S-CSCF 404, the P-CSCF 412, and the P-CSCF 416. IMS 402 utilizes Session Initiation Protocol (SIP), and the CSCF of the IMS 402 may comprise servers and proxies used to process SIP signaling packets. The IMS 402 may also include additional nodes which are not shown, such as an I-CSCF, policy control rules function (PCRF), and/or application server(s).

In some embodiments, the P-CSCF 412 and P-CSCF 416 are SIP proxy devices which serve as edge devices of the IMS 402. The P-CSCF 412 and P-CSCF 416 are assigned to the mobile communication devices 406 and mobile communication devices 408, respectively, before IMS registration, and all SIP signaling sent to and received from the mobile communication devices 406 and mobile communication devices 408 by the IMS 402 passes through the P-CSCF 412 and P-CSCF 416.

The HSS 418 may be a central database that contains the details, including public and private identifiers of subscriber devices, for each subscriber of the service provider of the telecommunication network. Public identifiers, such as IMPUs, and private identifiers, such as IMPIs, may be received by the IMS 402 during IMS registration and may be compared to the IMPUs and IMPIs stored by the HSS 418 for authentication purposes. Prior to service, such as handling of voice calls, the HSS 418 is provisioned with subscriber information, such the IMPUs, IMPIs, credentials, domains, P-CSCF uniform resource identifiers (URIs), and/or IP addresses. Clients on the mobile communication devices 406 and 408 may also be provisioned with this information.

In various embodiments, the S-CSCF 404 is a SIP server that performs session control. The S-CSCF 404 interfaces with the HSS 418, retrieving public identifiers and private identifiers for mobile communication devices 406 and mobile communication devices 408. The S-CSCF 404 also handles IMS/SIP registration and forks incoming calls. A flag may be set on the S-CSCF 404 to enable the call forking.

In some embodiments, the S-CSCF 404 is configured to perform IMS registration, such as registration in accordance with 3GPP 24.228. The S-CSCF 404 receives a SIP register message, uses the HSS 418 for authentication, and responds to the registering device, completing the IMS registration.

At a point subsequent to registration, one of the mobile communication devices, such as a mobile communication device 406, may call the other mobile communication devices 408. Because the other mobile communication devices 408 share a public identifier, the call is directed to all of them. The S-CSCF 404 receives a message from the mobile communication device 406 initiating the call and determines that the public identifier being call is associated with multiple private identifiers. Upon determining that the public identifier is associated with multiple private identifiers, the S-CSCF 404 forks the call, generating a call leg (also referred to herein as a "fork") for each mobile communication device 408. The S-CSCF 404 then delivers the call via the call legs to the mobile communication devices 408.

Those of the mobile communication devices 408 within the geofence then receive the call substantially simultaneously and are rung substantially simultaneously. When a user answers one of the mobile communication devices 408, messaging indicative of the answer is transmitted to the S-CSCF 404, which terminates the other call legs.

Example Operations

Figure 5:
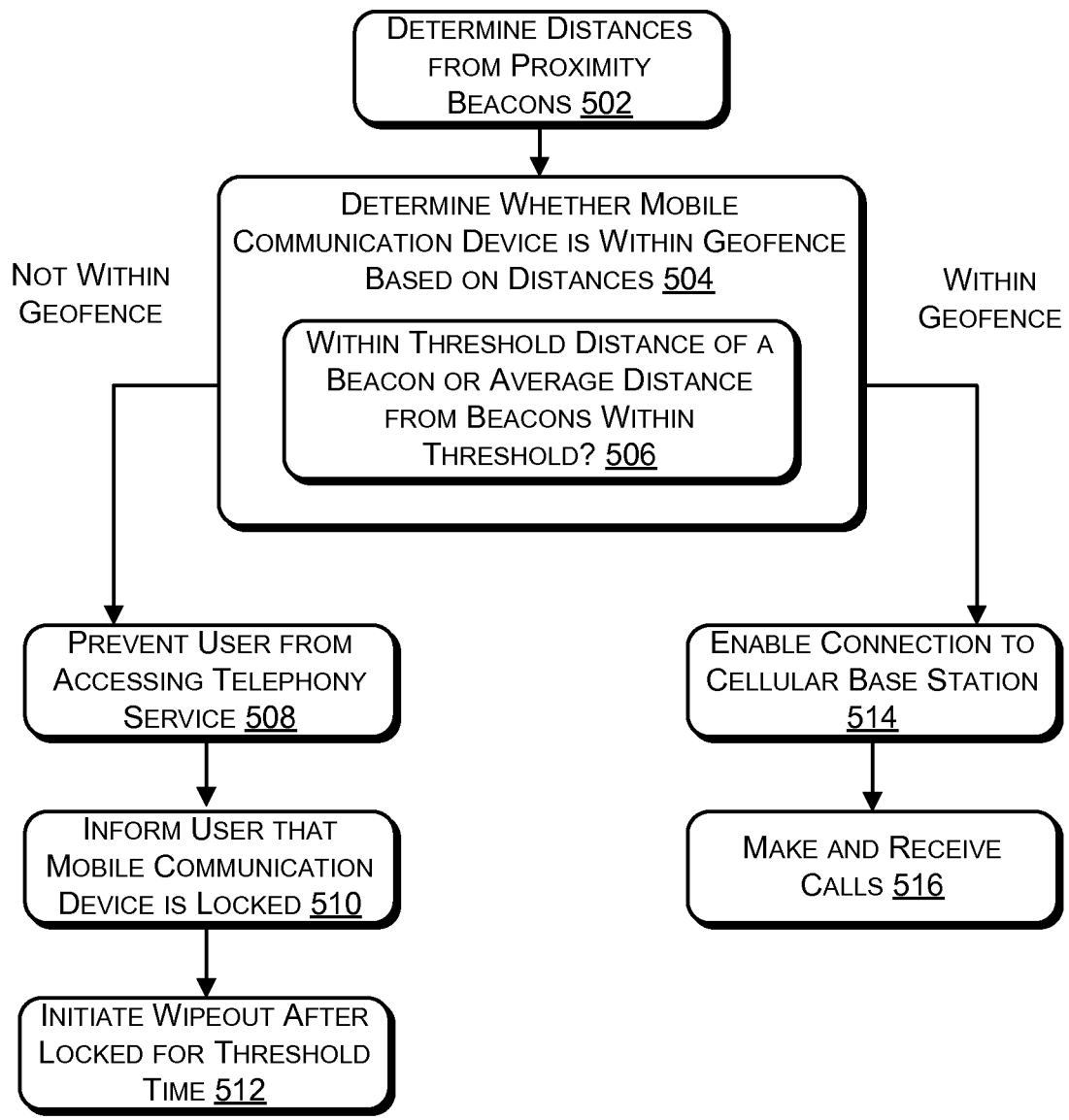
FIG. 5 illustrates an example process for determining whether a mobile communication device is within a geofence based on distances from proximity beacons and preventing or enabling access to telephony service through a cellular base station at a specific pre-defined location area associated with the geofence based on whether the mobile communication device is determined to be within the geofence.
Figure 6:
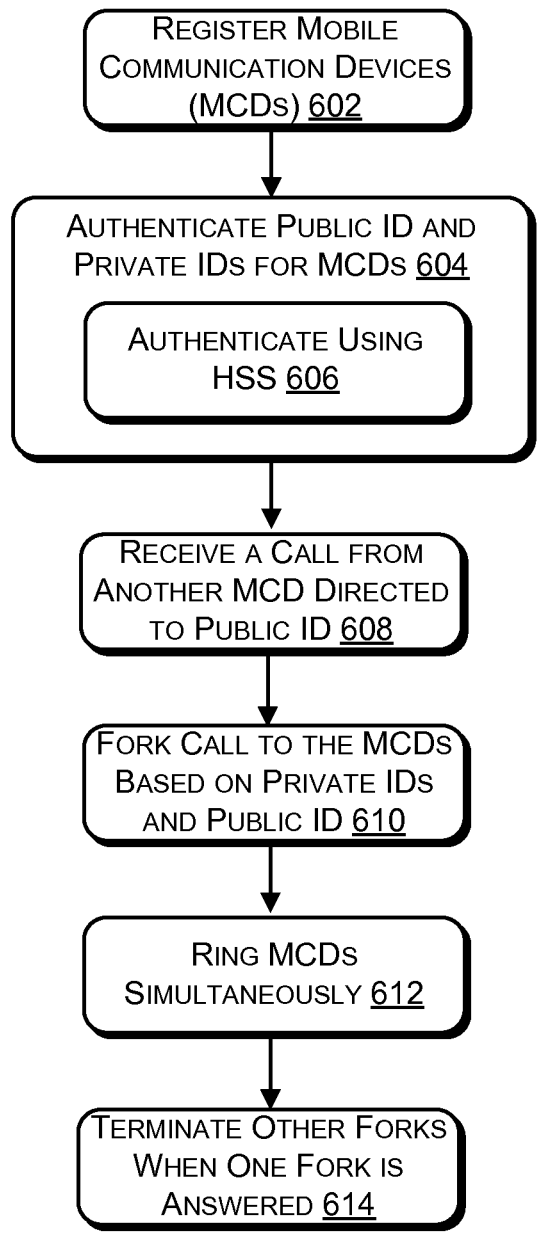
FIG. 6 illustrates an example process for receiving a call at a S-CSCF directed to a public identifier shared by a plurality of mobile communication devices and forking the call to those mobile communication devices based on associations of their private identifiers with the public identifier.

FIGS. 5-6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for determining whether a mobile communication device is within a geofence based on distances from proximity beacons and preventing or enabling access to telephony service through a cellular base station at a specific pre-defined location area associated with the geofence based on whether the mobile communication device is determined to be within the geofence. As shown at block 502, a mobile communication device may determine its distances from a plurality of proximity beacons. The proximity beacons may be placed in or adjacent to a specific pre-defined location area, such as a bullpen or dugout of a ballpark. As described above, the specific pre-defined location area may include a communication tower which includes a cellular base station and charging components for charging the mobile communication device and other mobile communication devices.

At block 504, the mobile communication device may determine whether it is within a geofence associated with the specific pre-defined location area based at least in part on the determined distances. At 506, this may include determining that the mobile communication device is within the geofence when it is within a threshold distance of at least one of the proximity beacons or when an average distance of the mobile communication device from the proximity beacons is less than a threshold distance.

At 508, in response to determining that it is outside of the geofence, the mobile communication device may prevent access to telephony service through the cellular base station. At 510, the mobile communication device may then inform its user that the mobile communication device is locked. If the mobile communication device remains locked/outside of the geofence for a threshold period of time, then the mobile communication device may, at 512, initiate a wipeout of itself.

At 514, if the mobile communication device instead determines that it is within the geofence, the mobile communication device may enable access to telephony service through the cellular base station. At 516, the mobile communication device may then make calls to and receive calls from a preconfigured other party, such as mobile communication devices of another communication tower. For example, if the mobile communication device belongs to a visiting team dugout, the mobile communication device may make calls to and receive calls from the mobile communication devices of the visiting team bullpen. The mobile communication device may also provide at least one of statistics, instant replays, messaging capabilities, or video calling capabilities when enabled access to telephony service through to the cellular base station of its communication tower.

FIG. 6 illustrates an example process for receiving a call at a S-CSCF directed to a public identifier shared by a plurality of mobile communication devices and forking the call to those mobile communication devices based on associations of their private identifiers with the public identifier. As shown at block 602, a S-CSCF of an IMS of a telecommunication network may receive registrations of a plurality of mobile communication devices. The mobile communication devices may share a public identifier, such as an IMPU, and may each have a private identifier, such as an IMPI.

At block 604, the S-CSCF may authenticate the public identifier and private identifiers. At 606, this may include comparing the public identifier and private identifiers to a public identifier and private identifiers stored in an HSS of the IMS.

At 606, the S-CSCF may receive a call from a mobile communication device that is directed to a public identifier shared by the registered plurality of mobile communication devices. In some embodiments, the plurality of mobile communication devices are one of bullpen devices or dugout devices and the other mobile communication device is one of the other of the bullpen devices or dugout devices.

At 608, the S-CSCF forks the call to the plurality of mobile communication devices based on associations between their private identifiers and the public identifier.

At 610, the mobile communication devices of the plurality of mobile communication devices ring substantially simultaneously. At 612, when the call is answered at one of the mobile communication devices, the forks to the others of the mobile communication devices are terminated.

Example System

FIG. 7 illustrates an example system architecture of a computing device 700, such as a system architecture of a mobile communication device 206, 304, 310, 406, or 408, or of a S-CSCF 404, in accordance with various embodiments. As illustrated, the computing device 700 includes processor(s) 702 and a system memory 704 storing modules and data 706. The computing device 700 also includes a removable storage 708, a non-removable storage 710, input device(s) 712, output device(s) 714, and communication connections 716 for communicating with other computing devices 718.

In some embodiments, the processor(s) 702 is a central processing unit (CPU), a graphics processing unit (GPU), or both CPU and GPU, or other processing unit or component known in the art.

In various embodiments, system memory 704 is volatile (such as RAM), non-volatile (such as ROM, flash memory, etc.) or some combination of the two. Example system memory 704 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 704 stores modules and data 706. The modules and data 706 may comprise any one or more modules, applications, processes, threads, classes, algorithms, data structures, files, and/or databases, such as the modules, applications, processes, threads, classes, algorithms, data structures, files, and/or databases utilized in performing the operations described above, some part of which are illustrated in FIGS. 1-6.

For example, when computing device 700 is a mobile communication device 206, 304, 310, 406, or 408, the modules and data 706 may include one or more modules for determining distances from proximity beacons, determining whether the computing device 700 is within a geofence, enabling access to telephony service through a cellular base station, preventing access to telephony service through a cellular base station, locking the computing device 700, informing a user that the computing device 700 is locked, making calls, or receiving calls. When computing device 700 is a S-CSCF 404, the modules and data 706 may include one or more modules for receiving registrations for mobile communication devices, storing identifiers of the mobile communication devices, receiving a call from a mobile communication device, and forking that call to multiple mobile communication devices.

The computing device 700 includes data storage devices (removable and/or non-removable) in addition to the system memory 704, such as, for example, magnetic disks, optical disks, or tape. Such additional storage is illustrated in FIG. 7 by removable storage 708 and non-removable storage 710. Computer storage media may include volatile and nonvolatile, removable and non-removable media implemented in any method or technology for storage of information, such as computer readable instructions, data structures, program modules, or other data. System memory 704, removable storage 708, and non-removable storage 710 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by the computing device 700. Any such computer-readable storage media may be part of the computing device 700.

In various embodiment, any or all of system memory 704, removable storage 708, and non-removable storage 710 store programming instructions which, when executed, implement some or all of the above-described operations of the computing device 700.

The computing device 700 may also have input device(s) 712, such as a keyboard, a mouse, a touch-sensitive display, voice input device, etc., and output device(s) 714 such as a display, speakers, a printer, etc. These devices are well known in the art and need not be discussed at length here.

The computing device 700 also contains communication connections 716 that allow the computing device 700 to communicate with other computing devices 718.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
   a casing;
   a cellular base station coupled to the casing and configured to provide a closed communication system;
   charging components coupled to the casing; and
   a first group of mobile communication devices designed to be plugged into the charging components for charging and to access the closed communication system through the cellular base station based at least in part on a determination that the first group of mobile communication devices is within a geofence associated with a first specific pre-defined location area; and
   a second group of mobile communications device designed to access the closed communication system through the cellular base station based at least in part on a determination that the second group of mobile communication devices is within a geofence associated with a second specific pre-defined location area;
   wherein the closed communications system provides communications only between the first group of mobile communication devices and the second group of mobile communication devices.

2. The system of claim 1, further comprising:
   one or more proximity beacons defining an area associated with the geofence.

3. The system of claim 2, wherein the geofence comprises the area within a threshold distance of at least one proximity beacon.

4. The system of claim 1, wherein the a first mobile communication device of the first group of mobile communication devices initiates a wipeout based at least in part on a determination that the first mobile communication device has remained outside of the geofence for a threshold amount of time.

5. The system of claim 1, wherein the system is located in one of a dugout or a bullpen of a baseball park and allows calls only with the other of the bullpen or the dugout of the baseball park.

6. The system of claim 1, wherein
   the a first mobile communication device of the first group of mobile communication devices is unable to access telephony service via the closed communication system through the cellular base station based at least partly on a determination that the first mobile communication device is outside the geofence, and
   other mobile communication devices are unable to access the closed communication system through the cellular base station based on a determination that they are inside the geofence.

7. The system of claim 1, wherein the cellular base station is a picocell base station or a femtocell base station.

8. A system comprising:
   a first communication tower comprising:
      a first casing;
      a first cellular base station coupled to the first casing and configured to communicate with a telecommunication network;
      a first set of charging components coupled to the first casing; and
      a first group of one or more mobile communication devices designed to (1) be plugged into the first set of charging components for charging and (2) access telephony service through the first cellular base station based at least in part on a determination that the first group of one or more mobile communication devices is within a geofence associated with a specific pre-defined location area; and
   a second communication tower comprising:
      a second casing;
      a second cellular base station coupled to the second casing and configured to communicate with the telecommunication network;
      a second set of charging components coupled to the second casing; and
      a second group of one or more mobile communication devices designed to (1) be plugged into the second set of charging components for charging and (2) access telephony service through the second cellular base station based at least in part on a determination that the second group of one or more mobile communication devices is within the geofence associated with the specific pre-defined location area;
   wherein the telecommunication network allow calls only between the first group of one or more mobile communication devices and the second group of one or more mobile communication devices.

9. The system of claim 8, wherein the first group of one or more mobile communication devices is located in a dugout of a baseball park; and
   wherein the second group of one or more mobile communication devices is located in a bullpen of the baseball park.

10. The system of claim 8, wherein all of the first group of one or more mobile communication devices ring simultaneously upon initiation of a call from the second group of one or more mobile communication devices to the first group of one or more mobile communication devices.

11. The system of claim 8, wherein the first group of one or more mobile communication devices and the second group of one or more mobile communication devices further comprise a user interface enabling initiation of a call with a single action.

12. The system of claim 11, wherein the single action comprises a single touch or a single swipe.

* * * * *